(12) United States Patent
Huang et al.

(10) Patent No.: US 9,130,884 B2
(45) Date of Patent: Sep. 8, 2015

(54) ROUTING DEVICE

(71) Applicant: Gemtek Technology Co., Ltd., Hsinchu (TW)

(72) Inventors: Min-Wei Huang, Hsinchu (TW); Pei-Lin Wu, Hsinchu (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 204 days.

(21) Appl. No.: 13/831,857

(22) Filed: Mar. 15, 2013

(65) Prior Publication Data

US 2013/0315243 A1    Nov. 28, 2013

Related U.S. Application Data

(60) Provisional application No. 61/650,489, filed on May 23, 2012.

(51) Int. Cl.
| | |
|---|---|
| *H04L 12/741* | (2013.01) |
| *H04L 12/56* | (2006.01) |
| *H04L 12/46* | (2006.01) |
| *H04L 29/12* | (2006.01) |

(52) U.S. Cl.
CPC .............. *H04L 45/741* (2013.01); *H04L 12/46* (2013.01); *H04L 61/256* (2013.01); *H04L 61/2592* (2013.01); *H04L 61/2514* (2013.01); *H04L 61/6068* (2013.01)

(58) Field of Classification Search
None
See application file for complete search history.

(56) References Cited

U.S. PATENT DOCUMENTS

| | | | | |
|---|---|---|---|---|
| 8,660,129 | B1* | 2/2014 | Brendel et al. | 370/397 |
| 2007/0081539 | A1* | 4/2007 | Shaikli | 370/394 |
| 2011/0310899 | A1* | 12/2011 | Alkhatib et al. | 370/392 |
| 2014/0115584 | A1* | 4/2014 | Mudigonda et al. | 718/1 |

FOREIGN PATENT DOCUMENTS

| | | |
|---|---|---|
| CN | 101197856 | 6/2008 |
| CN | 101316230 | 12/2008 |
| JP | 2003-158520 | 5/2003 |
| JP | 2007-049499 | 2/2007 |
| JP | 2008-301024 | 11/2008 |
| JP | 2009-182789 | 8/2009 |
| JP | 2011515944 | 5/2011 |
| JP | 2011-188448 | 9/2011 |

* cited by examiner

*Primary Examiner* — Habte Mered
(74) *Attorney, Agent, or Firm* — Jianq Chyun IP Office (57) ABSTRACT

A routing device is provided, the routing device includes a first network interface unit, a second network interface unit and a processing unit. The first network interface unit connects the routing device to a local private network. The second network interface unit connects the routing device to the Internet. The processing unit assigns a virtual subnet to a remote routing device for a remote host in a remote private network to obtain a virtual Internet protocol (IP) address according to the virtual subnet. The processing unit receives a network packet from a local host in the local private network through the first network interface unit, and encapsulates the network packet according to a public IP address of the remote routing device to generate an alternative packet. Then, the processing unit delivers the alternative packet to the Internet through the second network interface unit.

9 Claims, 7 Drawing Sheets

ROUTING DEVICE

CROSS-REFERENCE TO RELATED APPLICATION

This application claims the priority benefits of U.S. provisional application Ser. No. 61/650,489, filed on May 23, 2012. The entirety of the above-mentioned patent application is hereby incorporated by reference herein and made a part of this specification.

BACKGROUND OF THE INVENTION

1. Field of the Invention

The present invention relates to a network communication technology. Particularly, the invention relates to a routing device.

2. Description of Related Art

With the rapid spread of the Internet, a number of Public Internet Protocol address (public IP address) is insufficient due to rapidly emerging network users under the architecture of Internet Protocol Version 4 (IPv4). Therefore, ever since concepts of Private Network, Enterprise Intranet or Virtual Private Network are proposed, private network nowadays is widely used by organizations and institution everywhere.

Generally, in a private network, hosts can communicate with each other through customized Private Internet Protocol address (private IP address), in which a common private IP address may be, for example, an IP address with the first two digits being "192.168" (e.g., 192.168.1.101) or an IP address with first digit being "10" (e.g., 10.1.2.3). For communication to the outside, the hosts in the private network may be easily connected to the Internet by using the same public IP address through a NAT Server or a router with a Network Address Translation (NAT) feature.

Figure 1:
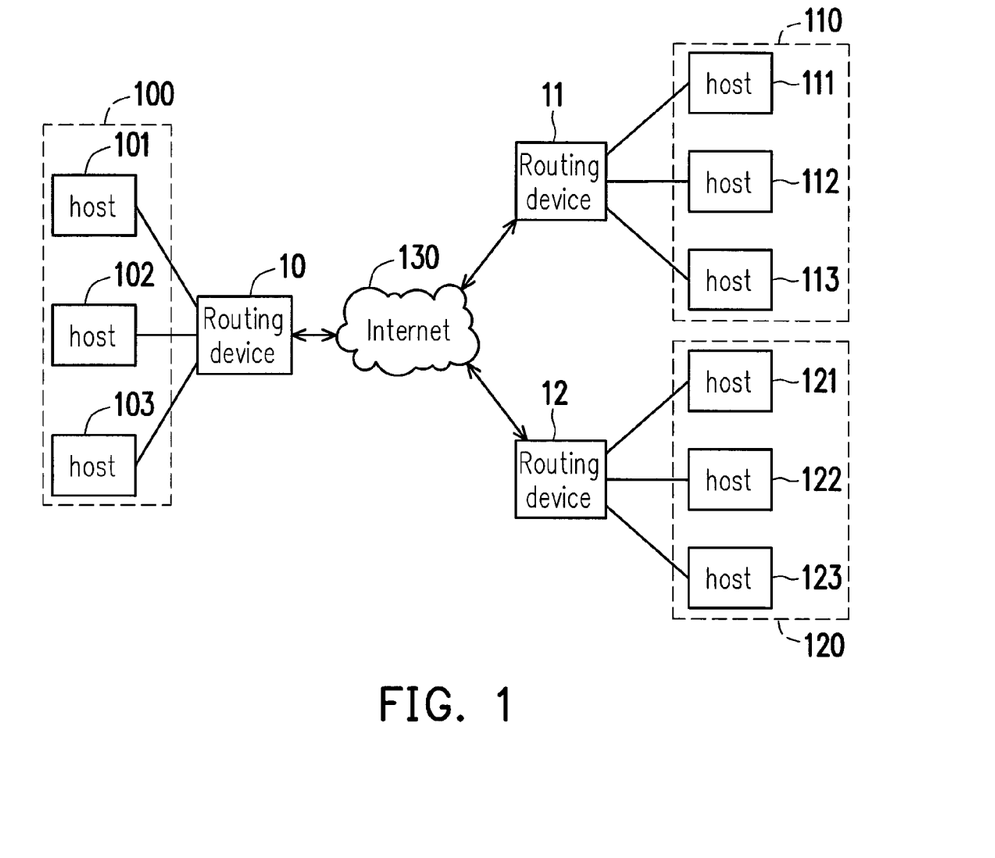
FIG. 1 is a schematic view illustrating a network architecture composed by a plurality of private networks in conventional art.

For instance, FIG. 1 is a schematic view illustrating a network architecture composed by a plurality of private networks in conventional art. Referring to FIG. 1, private networks 100 to 120 is respectively composed by routing devices 10 to 12 and hosts 101 to 103, 201-203 and 301 to 303, in which the routing devices 10 to 12 perform a NAT task on a network packet from the private networks 100 to 120 to the Internet 130 or from the Internet 130 to the private networks 100 to 120, respectively.

For instance, when the host 101 in the private network 100 intends to transmit a network packet to the Internet 130, once the network packet passes through the routing device 10, the routing device 10 may convert a source IP address and a source port number of the network packet respectively from a private IP address (e.g., 192.168.1.101) and a private port number (e.g., 254130) used by the host 110 into a public IP address (e.g., 59.120.x.x) and a public port number (e.g., 5812) used by an external Network Interface Card (NIC) of the routing device 10, records the private IP address (e.g., 192.168.1.101) and the private port number (e.g., 254130) of the host 110 corresponding to the public port number (e.g., 5812) with an index value and then transmits the network packet to the Internet 130.

Accordingly, when the routing device 10 receives a network packet from the Internet 130, the routing device 10 locates a corresponding index value according to the public port number (e.g., 5812) in the network packet, obtains the private IP address (e.g., 192.168.1.101) and the private port number (e.g., 254130), and relays the network packet to the host 101.

Although the NAT method as mentioned above may allow the network packet to be transmitted successfully between the private network and the Internet, it is still requires improvement in transmitting the network packet between a plurality of private networks. In other words, with respect to FIG. 1 as an example, when the host 101 intends to transmit a network packet to the host 201, the routing device 10 may not be able to locate the host 201 (this is because the host 201 uses the private IP address instead of the public IP address). Accordingly, how to enable the hosts in the plurality of private networks to communicate with each other, is indeed an issue to be studied and developed in the field.

SUMMARY OF THE INVENTION

Accordingly, the invention proposes a routing device, which may perform a network communication for a plurality of hosts in different private networks by utilizing a virtual IP address.

A virtual private network communication method is provided and adopted for a routing device. The virtual private network communication method includes the following steps. The routing device assigns a virtual subnet to a remote routing device for at least one remote host in a remote private network to respectively obtain at least one virtual IP address according to the virtual subnet. In addition, when a first local host in the local private network transmits a first network packet to the target remote host in the remote private network, the routing device encapsulates the network packet according to the public IP address and the public port number of the remote routing device to generate a first alternative packet, and delivers the first alternative packet to the Internet. Therein, the first alternative packet includes the first network packet having the virtual IP address of the target remote host as a destination IP address.

The invention provides a routing device including a first network interface unit, a second network interface unit, a storage unit and a processing unit. The first network interface unit is configured to connect the routing device to a local private network. The second network interface unit is configured to connect the routing device to the Internet. The processing unit is coupled to the first network interface unit and the second network interface unit, and configured to assign a virtual subnet to a remote routing device for at least one remote host in a remote private network to obtain at least one virtual Internet protocol (IP) address according to the virtual subnet. When the first local host in the local private network transmits the first network packet to the target remote host in the remote private network, the processing unit receives the first network packet through the first network interface unit and encapsulates the first network packet according to the public IP address and the public port number of the remote routing device to generate the first alternative packet. Next, the processing unit delivers the alternative packet to the Internet through the second network interface unit, in which the alternative packet includes the first network packet, and the destination IP address of the first network packet is the virtual IP address of the target remote host.

In view of above, the virtual private network communication method and the routing device using the same in the embodiments of the invention may be used to assign the virtual subnet to the remote routing device for at least one remote host in the remote private network to respectively obtain at least one virtual IP address according to the virtual subnet. When the local host in the local private network transmits the network packet to the target remote host in the remote private network, the network packet is encapsulated according to a public IP address of the remote routing device to generate the alternative packet. When the alternative packet is received, the alternative packet is decapsulated, so as to obtain the network packet from the alternative packet. Next, the destination IP address of the network packet may be used to locate the private IP address corresponding to the destination IP address, and the network packet is then relaid to the local host corresponding to the private IP address. Accordingly, a plurality of hosts in different private networks may respectively perform the network communication by using the virtual IP address being assigned.

To make the above features and advantages of the disclosure more comprehensible, several embodiments accompanied with drawings are described in detail as follows.

DESCRIPTION OF THE EMBODIMENTS

The invention relates to a virtual private network communication method and a routing device using the same, which may be used to perform a network communication for local hosts in a local private network with remote hosts in a remote private network. In the virtual private network communication method, a plurality of different virtual subnets are properly managed and assigned to the local routing device and the remote routing device, so the virtual subnets are not repeatedly used in the local private network and at least one remote private network, so as to enable a virtual private network to be formed by the local routing device and the remote routing device. Accordingly, the local host in the local private network and the remote host in the remote private network may perform a communication with network packets between different private networks according to the virtual IP address being assigned, respectively.

Figure 2:
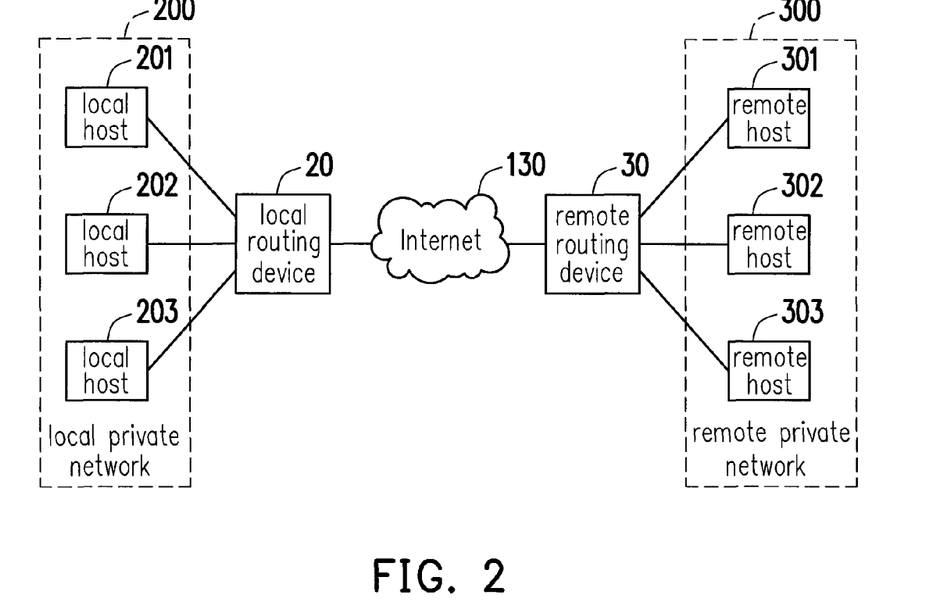
FIG. 2 is a schematic view illustrating a local private network and a remote private network connected via the Internet according to an embodiment of the invention.
Figure 3:
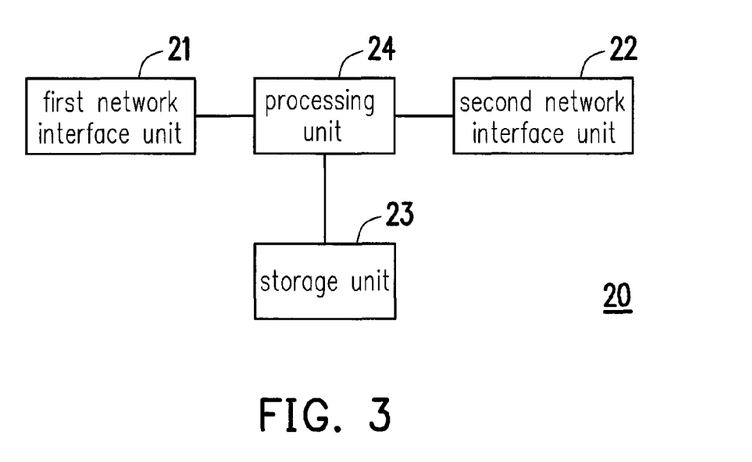
FIG. 3 is a schematic block diagram illustrating a routing device according to an embodiment of the invention.

FIG. 2 is a schematic view illustrating a local private network and a remote private network connected via the Internet according to an embodiment of the invention. FIG. 3 is a schematic block diagram illustrating a routing device according to an embodiment of the invention.

Referring to FIG. 2 and FIG. 3, a local routing device 20 includes a first network interface unit 21, a second network interface unit 22, a storage unit 23 and a processing unit 24. The first network interface unit 21 is configured to connect the local routing device 20 to a local private network 200. The second network interface unit 22 is configured to connect the local routing device 20 to the Internet 130. In the present embodiment, the first network interface unit 21 and the second network interface unit 22 may both be, for example, a network interface card. It is noted that, for convenience of explanation, the present embodiment is described using the local routing device 20 as an example, however, a basic structure of the remote routing device 30 is substantially similar to that of the local routing device 20, so related description is omitted hereinafter.

The storage unit 23 is configured to store data and the storage unit 23 may be various non-volatile memories such as a dynamic random access memory (DRAM), a static random access memory (SRAM), or a combination of the above. In addition, the storage unit 23 may include a hard drive, an optical drive or an external storage device or a combination of the above, the implementation of the storage unit 23 is not particularly limited in the invention.

In the present embodiment, the processing unit 24 may be a central processing unit (CPU), a micro-processor, an embedded controller, and the implementation of the invention is not limited to the above. The processing unit 24 is coupled to the first network interface unit 21, the second network interface unit 22 and the storage unit 23, and configured to assign a virtual subnet to the remote routing device 30 for the remote hosts 301 to 303 in the remote private network 300 to obtain a virtual IP address according to the virtual subnet respectively. For instance, the virtual IP address obtained by the remote host 301 may be 10.3.21.101; the virtual IP address obtained by the remote host 302 may be 10.3.21.102; and the virtual IP address obtained by the remote host 303 may be 10.3.21.103.

It should be noted that, the virtual subnet as mentioned in the present embodiment of the invention is substantially used to define a range and a number of the virtual IP address available for each of the private networks. In the present embodiment, the virtual subnet includes four digits with the last digit represented in x (herein, x is used to represent any one positive integer selected from 1 to 255), such as 10.3.21.x, in which each of the digits is 8 bits. For instance, if the virtual subnet of the remote routing device 30 assigned by the local routing device 20 is 10.3.21.x, the virtual IP addresses available for the remote hosts 301 to 303 in the remote private network 300 may be 10.3.21.1 to 10.3.21.225.

When it comes to select the proper virtual IP address, for instance, it is assumed that the private IP address used by the remote host 301 is 192.168.75.101 before assigning the virtual IP address according to the virtual subnet in the present embodiment of the invention. After the remote routing device 30 is informed that the virtual IP address available for the remote private network 300 is within a range of the virtual subnet 10.3.21.x, based on the last digit of the original private IP address 192.168.75.101 (i.e., 101) and the virtual subnet 10.3.21.x, the remote host 301 may obtain the virtual IP address 10.3.21.101 which is re-assigned (i.e., set x in the virtual subnet 10.3.21.x as 101).

It should be noted that, the range of the virtual subnet and the method of assigning at least one virtual IP address to the private network according to the virtual subnet as mentioned in the present embodiment is not limited thereto. According to another embodiment of the invention, the range of the virtual subnet may also be represented in formats such as 10.3.x.x, 10.x.x.x or 192.168.x.x (in which, x may be any positive integer selected from 1 to 255). For instance, the virtual subnet 10.3.x.x. indicates that the virtual IP addresses within the range from 10.3.1.1 to 10.3.255.255 are all available for assigning to the hosts in the private network of the virtual subnet. Accordingly, by adjusting a value and a number of the variable x in the virtual subnet, a range of selecting the virtual IP address for the hosts in each of the private networks may be effectively managed.

It should be noted that in the present embodiment, when a processing unit 24 of the local routing device 20 assigns virtual subnet to a plurality of remote routing devices, it is required that all the virtual subnet being assigned to be different from each other, so as to avoid the same virtual IP address being repeatedly selected by the remote hosts in the remote private networks. Therefore, in the present embodiment, the processing unit 24 of the local routing device 20 may perform a IP address negotiation process with the remote routing device, so as to effectively assign the different virtual subnets to the plurality of remote routing devices.

For instance, during one IP address negotiation process, first, the processing unit 24 of the local routing device 20 may obtain at least one candidate virtual subnet as unassigned from a bitmap table (e.g., stored in the storage unit 23 depicted in FIG. 3). Next, the processing unit 24 of the local routing device 20 selects a virtual subnet among the at least one candidate virtual subnet with a preset selecting sequence or randomly, and assigns the virtual subnet to the remote routing device. Lastly, the processing unit 24 of the local routing device 20 records the virtual subnet into the bitmap table, and marks the virtual subnet as already assigned to the remote routing device, so as to complete this IP address negotiation process. Accordingly, the bitmap table is updated correspondingly when each time the processing of assigning the virtual subnet to the remote routing device is completed, so as to provide the processing unit 24 of the local routing device 20 a feature of identifying usage status of each virtual subnet.

In the present embodiment, the processing unit 24 of the local routing device 20 may utilize the bitmap table which is composed by a two-dimensional array with at least one row and at least one column. For instance, to clearly indicate each virtual subnet by using the bitmap table, the processing unit 24 of the local routing device 20 records a digit of the at least one candidate virtual subnet to the at least one row corresponding a first dimensional direction in the two-dimensional array, and records another digit of the at least one candidate virtual subnet to at least one column corresponding a second dimensional direction in the two-dimensional array, in which the at least one candidate virtual subnet comprises at least four digits. In addition, the processing unit 24 of the local routing device 20 may also mark a usage status of the at least one candidate virtual subnet to an intersection corresponding to said digit and said another digit in the two-dimensional array.

For instance, when the bitmap table is initialized or established for the first time, the processing unit 24 of the local routing device 20 may mark the at least one candidate virtual subnet as unassigned in the bitmap table by utilizing a first identification code and mark the virtual subnet owned by the local routing device in the bitmap table by utilizing a second identification code. Next, after each time the IP address negotiation process is completed, the processing unit 24 of the local routing device 20 may mark the candidate virtual subnet as assigned in the bitmap table by utilizing a third identification code. The first identification may be "0"; the second identification code may be "2"; and the third identification code may be "1".

Figure 4:
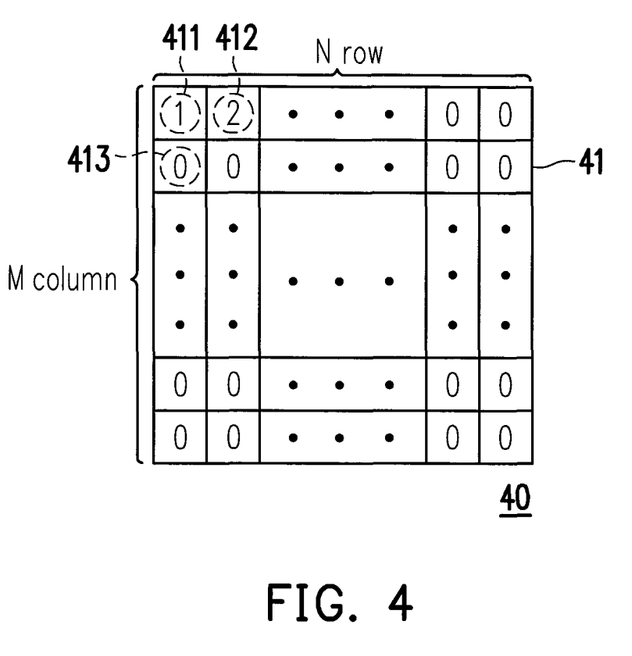
FIG. 4 is a schematic view illustrating a bitmap table according to an embodiment of the invention.

More specifically, FIG. 4 is a schematic view illustrating a bitmap table according to an embodiment of the invention.

Referring to FIG. 4, a bitmap table 40 is composed by a two-dimensional array 41 with N rows and M columns, in which a A-th column (i.e., the first dimensional direction) of the two-dimensional array 41 corresponds to the second digit in the N-th candidate virtual subnet (e.g., A in 10.A.B.x), whereas a B-th row (i.e., the second dimensional direction) of the two-dimensional array 41 corresponds to the third digit in the M-th candidate virtual subnets (e.g., B in 10.A.B.x), in which A, B, N and M are all positive integers and 1<A<N while 1<B<M. In the present embodiment, the bitmap table 40 is composed by the two-dimensional array 41 with 255 rows and 255 columns, however, values of N and M may be substantially adjusted according to design or practical requirements.

For instance, according to the present embodiment, the first identification is represented by "0"; the second identification code is represented by "2"; and the third identification code is represented by "1". In other words, "0", "1" and "2" as indicated on the intersection of each row and each column are used to represent the candidate virtual subnet unassigned, the candidate virtual subnet assigned and the virtual subnet owned by the routing device, respectively.

For instance, with respect to a dashed area 411, in which the intersection of the first row (i.e., A in 10.A.B.x is 1) and the first column (i.e., B in 10.A.B.x is 1) is marked as "1", so the processing unit of the local routing device is informed that 10.1.1.x is already assigned. In this case, during the IP address negotiation process, the processing unit of the local routing device may skip this candidate virtual subnet and check the next marked intersection as to determine whether to select the candidate virtual subnet corresponding to said next marked intersection. With respect to a dashed area 412, in which the intersection of the second row and the first column is marked as "2", so the processing unit of the local routing device is informed that 10.1.2.x is the virtual subnet owned by the local routing device. With respect to a dashed area 413, in which the intersection of the first row and the second column is marked as "0", so the processing unit of the local routing device is informed that 10.2.1.x is unassigned, such that 10.2.1.x may be directly selected for assigning to the remote routing device that requires the candidate virtual subnet.

It should be noted that, according to another embodiment of the invention, one-dimensional or three-dimensional arrays may also be used for the bitmap table. For instance, a C-th element of the one-dimensional array may be used to indicate a format such as 10.2.C.x; or A, B and C being three directions of the three-dimensional array may be used together to indicate a format such as A.B.C.x. In addition, according to yet another embodiment of the invention, a coordinate may also be used to mark the usage status of the candidate virtual subnet corresponding to the coordinate. For instance, the coordinates (A, B, C) are used to indicate a format such as 10.A.B.x, in which C is configured for assigning the first identification code, the second identification code and the third identification code as mentioned above, the invention is not limited the above embodiments. Accordingly, the processing unit of the local routing device may effectively assign the different virtual subnets to the remote routing devices by using the IP address negotiation process and according to the bitmap table.

Table 1 below is a schematic view illustrating the original private IP addresses and the re-assigned virtual IP addresses of the local host 201 and the remote host 301 in the present embodiment.

TABLE 1

|  | Local host 201 | Remote host 301 |
|---|---|---|
| (Original) private IP address | 192.168.75.101 | 192.168.75.101 |
| (Re-assigned) virtual IP address | 10.1.23.101 | 10.3.21.101 |

Referring back to FIG. 2 and FIG. 3, when the local host 201 in the local private network 200 transmits a network packet to the remote host 301 in the remote private network 300, the processing unit 24 of the local routing device 20 may receive the network packet through the first network interface unit 21, and encapsulates the network packet according to a public IP address of the remote routing device 30 to generate an alternative packet. Next, the processing unit 24 of the local routing device 20 may deliver the alternative packet to the Internet 130 through the second network interface unit 22, in which the alternative packet includes said network packet, and the destination IP address of said network packet is the virtual IP address obtained by the remote host 301, such as 10.3.21.101.

It should be noted that, in the present embodiment, the processing unit 24 may also assign the local virtual IP address to the local hosts 201 to 203 in the local private network 200 according to the virtual subnet owned by the local routing device 20, and updates the bitmap table accordingly (e.g., the dashed area 412 depicted in FIG. 4). Next, when the local host 201 transmits a network packet to the remote host 301 in the remote private network 300, the local host 201 may set the virtual IP address obtained by the remote host 301 (e.g., 10.30.21.101) as the destination IP address of the network packet. In addition, when the network packet is transmitted to pass the local routing device 20, the processing unit 24 of the local routing device 20 may set the virtual IP address (e.g., 10.1.23.101) of the local host 201 as a source IP address of the network packet. Alternatively, in other embodiments, when the local host 201 transmits a network packet to the remote host 301 in the remote private network 300, the local host 201 may set the virtual IP address (e.g., 10.3.21.101) of the remote host 301 as the destination IP address of the network packet and set the virtual IP address (e.g., 10.1.23.101) of the local host 201 as the source IP address of the network packet at the same time.

Accordingly, in the process of routing the network packet, after the alternative packet is decapsulated by the remote routing device 30 so as to obtain the network packet, the remote routing device 30 may locate the private IP address (e.g., 192.168.75.101) of the remote host 301 corresponding to the destination IP address according to the destination IP address (i.e., the virtual IP address of the remote host 301 such as 10.3.21.101) and the source IP address (i.e., the virtual IP address of the local host 201 such as 10.1.23.101) in the network packet which are re-assigned, and relay the network packet to the remote host 301 corresponding to the private IP address of the remote host 301 (e.g., 192.168.75.101). Accordingly, the network packet may successfully reach the remote host 301 via the remote routing device 30.

It should be noted that, in the present embodiment, the original private IP address (e.g., 192.168.75.101) respectively owned by the local hosts 201 to 203 and the remote hosts 301 to 303 may be changed to the virtual IP address being re-assigned (e.g., 10.3.21.101 and 10.1.23.101), but the invention is not limited thereto.

According to another embodiment of the invention, it is not required for the original private IP address (e.g., 192.168.75.101) respectively owned by the local hosts 201 to 203 and the remote hosts 301 to 303 to be substantially changed. Instead, a detailed corresponding relation between the virtual IP address being reassigned and the original private IP address of the local hosts 201 to 203 and the remote hosts 301 to 303 may be recorded into an IP address mapping table in each of the local routing device 20 and the remote routing device 30. In other words, the original private IP address (e.g., 192.168.75.101) is still used for internal communication in the private networks of the local hosts 201 to 203 and the remote host 301 to 303, respectively. That is, the network packets transmitted in the same private network substantially uses the original private IP address of each of the local hosts 201 to 203 and the remote hosts 301 to 303 as the source IP address and the destination IP address.

In other words, only when a network communication is performed between a plurality of private networks (e.g., when the local host 201 in the local private network 200 transmits the network packet to the remote host 301 in the remote private network 300), the local routing device 20 and the remote routing device 30 may respectively check a stored IP address mapping table of its own, so as to obtain the corresponding relation between the virtual IP address (e.g., 10.1.23.101) and the original private IP address of a source host (e.g., the local host 201).

Generally, in a process of encapsulating data into the network packet for transmitting via the Internet, the data is usually encapsulated into a user datagram protocol (UDP) packet or a transmission control protocol (TCP) packet first. Next, the UDP packet or the TCP packet is sequentially encapsulated into an IP packet, and the IP packet is encapsulated into an Ethernet frame. Generally, a header of the IP packet in the Ethernet frame includes at least one set of the source IP address and the destination IP address. Accordingly, the routing device on a path for transmitting the IP packet may transmit the IP packet according to the source IP address and the destination IP address in the IP packet in the Ethernet frame.

Figure 5:
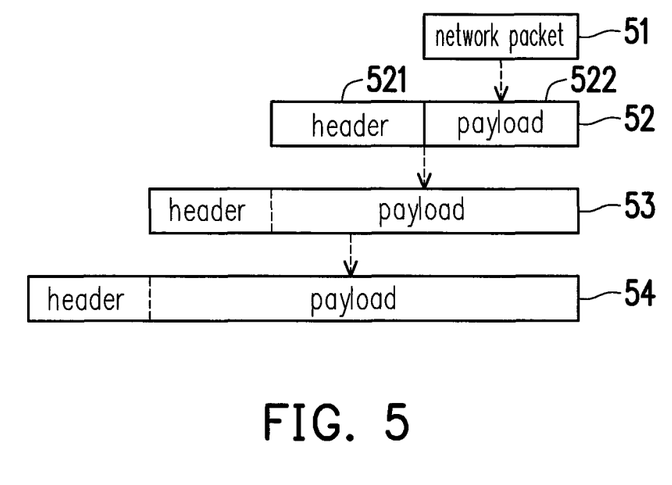
FIG. 5 is a schematic view illustrating an alternative packet generated by encapsulating a network packet according to an embodiment of the invention.

FIG. 5 is a schematic view illustrating an alternative packet generated by encapsulating a network packet according to an embodiment of the invention. Referring to FIG. 5, in the encapsulating process of the present embodiment, the processing unit of the local routing device may first encapsulate a network packet 51 into a UDP packet 52. For instance, the network packet 51 is used as a payload 522 of the UDP packet 52 of the alternative packet. Next, the processing unit of the local routing device may sequentially encapsulate the UDP packet 52 into a IP packet 53, so as to generate the alternative packet. It should be noted that, an IP header of the alternative packet (i.e., the IP packet 53) also includes the source IP address (e.g., the public IP address of the local routing device 20) and the destination IP address (e.g., the public IP address of the remote routing device 30).

Based on above, in the embodiments of the invention, after an alternative packet is generated by the routing device, the routing device may be informed of a routing method for transmitting the alternative packet (e.g., relaying the alternative packet to remote host 301 via the remote routing device 30) according to the source IP address and the destination IP address in the alternative packet. It is noted that, the routing method for transmitting packets is well-known to person skilled in the art, thus related description is omitted hereinafter.

It should be noted again that, in the embodiments of the invention, despite that the IP packet in the network packet also includes the source IP address and the destination IP address, they are different to the source IP address and the destination IP address in the alternative packet. More specifically, in the network packet, the source IP address may be, for example, the virtual IP address (10.1.23.101) re-assigned to the local host 201, whereas the destination IP address may be, for example, the virtual IP address (10.3.21.101) re-assigned to the remote host 301. However, in the alternative packet, the source IP address may be, for example, the public IP address of the local routing device 20, whereas the destination IP address may be, for example, the public IP address of the remote routing device 30.

Referring back to FIG. 2 and FIG. 3 again, with respect to receiving and processing of the alternative packet, take the local routing device 20 as an example, when the second network interface unit 22 of the local routing device 20 receives an alternative packet, the processing unit 24 of the local routing device 20 may decapsulate the alternative packet and obtain a network packet from the alternative packet. In addition, the processing unit 24 of the local routing device 20 may locate the corresponding private IP address (e.g., the original private IP address of the local host 201, 192.168.75.101) by checking the IP address mapping table (or an assignment record table of the virtual subnet) according to the destination IP address (e.g., 10.1.23.101) in the IP header of the network packet. Next, the processing unit 24 of the local routing device 20 relays the network packet to the local host 201 through the first network interface unit 21 according to the obtained private IP address. Similarly, when the remote routing device 30 receives the alternative packet with the destination IP address (i.e., the virtual IP address) directing to the remote host 301, the remote routing device 30 may locate the corresponding private IP address by checking the IP address mapping table with a proper address conversion according to the virtual IP address of the network packet. Next, the remote routing device 30 relays the network packet obtained by decapsulating the alternative packet to the remote host 301 according to the private IP address.

It is noted that, with respect to a routing device with the Internet at a front end and the private network at a back end, such routing device usually comes with features of both a firewall and a NAT. Therein, a basic function of the firewall is to block unidentified network traffic or network packet from entering to the routing device under protection or to the private network at back end. Take FIG. 2 as an example, in order to enable the local host 201 having the firewall to perform a network communication with the remote host 301, or enable the local host 201 to perform the network communication with the remote host 301 in a subnet of the remote routing device 30 having the firewall, it is required for the local routing device 20 and the remote routing device 30 to be capable of communicating with each other. In other words, packets may not be transmitted successfully or a connection may not be established between the local routing device 20 and the remote routing device 30 due to blocking of the firewall or other packet filtering mechanism.

Figure 6:
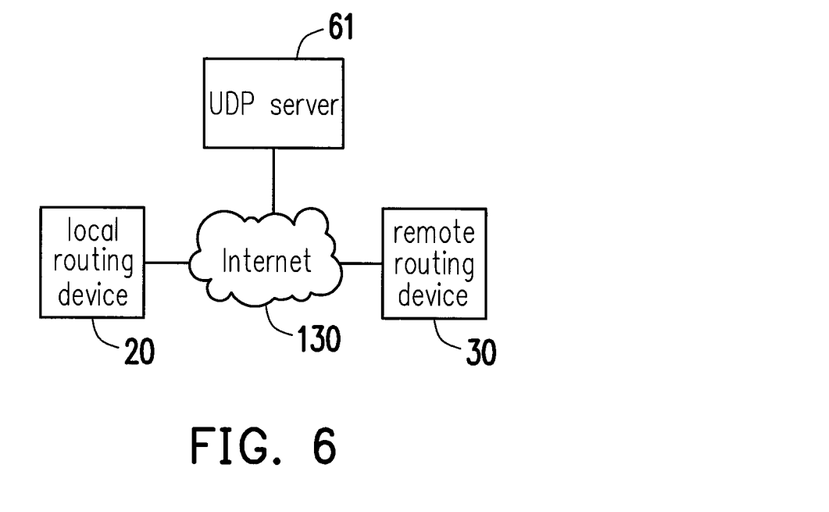
FIG. 6 is a schematic view illustrating a local private network and a remote private network connected via the Internet according to another embodiment of the invention.

FIG. 6 is a schematic view illustrating a local private network and a remote private network connected via the Internet according to another embodiment of the invention. Referring to FIG. 3 and FIG. 6, the local routing device 20 and the remote routing device 30 are embodied similar to implementation as depicted in FIG. 3. In the present embodiment, the processing unit 24 of the local routing device 20 attempts to establish a peer-to-peer connection with the remote routing device 30 through the second network interface unit 22 and determines whether the peer-to-peer connection is successfully established with the remote routing device 30. The processing unit 24 delivers the public IP address and the public port number of the local routing device 20 to the remote routing device 30 through the second network interface unit 22 via a user datagram protocol (UDP) server 61 when the peer-to-peer connection is not successfully established with the remote routing device 30, so as to obtain the public IP address and the public port number of the remote routing device 30.

In other words, if the peer-to-peer connection is not successfully established with the remote routing device 30, it means that the packets may not be transmitted successfully or the connection may not be established between the local routing device 20 and the remote routing device 30 due to blocking of the firewall or other packet filtering mechanism. Therefore, for instance, the processing unit 24 of the local routing device 20 establishes a connection with the UDP server 61 through the second network interface unit 22 for storing information of the public IP address and the public port number of the local routing device 20 into the UDP server 61. Similarly, the remote routing device 30 also establishes a connection with the UDP server 61 for storing information of the public IP address and the public port number of the remote routing device 30 into the UDP server 61. Next, the local routing device 20 and the remote routing device 30 respectively connect to the UDP server 61 to obtain the public IP address and the public port number of each other's, so as to perform the network communication by using the public IP address and the public port number of each other's. Accordingly, whether the firewall is present will not affect the communication between the private networks.

According to the present embodiment, the UDP server 61 may be any server with capabilities of connecting and recording a connection information, the invention is not limited thereto.

It should be noted that, if it is known that the firewall or the other packet filtering mechanism is not existing between the local routing device and the remote routing device, the local routing device and the remote routing device may directly obtain the information of the public IP address and the public port number via the peer-to-peer connection without using the UDP server for exchange said information.

Based on above, in case when the local routing device (e.g., the local routing device 20) and the remote routing device (e.g., the remote routing device 30) have both obtain the public IP address and the public port number of each other's, the processing unit (e.g., the processing nit 24) of the local routing device may locate the public IP address and the public port number of the remote routing device (e.g., the remote routing device 30) corresponding to the virtual IP address obtained by a target remote host (e.g., the remote host 301) according to the virtual IP address obtained by the target remote host (e.g., the remote host 301) in the IP header of the network packet being received. In addition, during the process of encapsulating the network packet to generate an alternative packet by the processing unit of the local routing device, the processing unit of the local routing device may encapsulate the public IP address and the public port number of the local routing device as well as the public IP address and the public port number of the remote routing device into the alternative packet. For instance, the processing unit 24 of the local routing device 20 may encapsulate the public IP address of the local routing device 20 and the public IP address of the remote routing device 30 into the IP header of the alternative packet (e.g., the IP header of the IP packet 53 depicted in FIG. 5). In addition, the processing unit 24 of the local routing device 20 may encapsulate the public port number of the local routing device 20 and the public port number of the remote routing device 30 into a UDP header of the alternative packet (e.g., a UDP header 521 of the UDP packet 52 depicted in FIG. 5). Accordingly, when an alternative packet is received by the local routing device or the remote routing device, a proper routing operation may be executed according to said information in the alternative packet.

Figure 7:
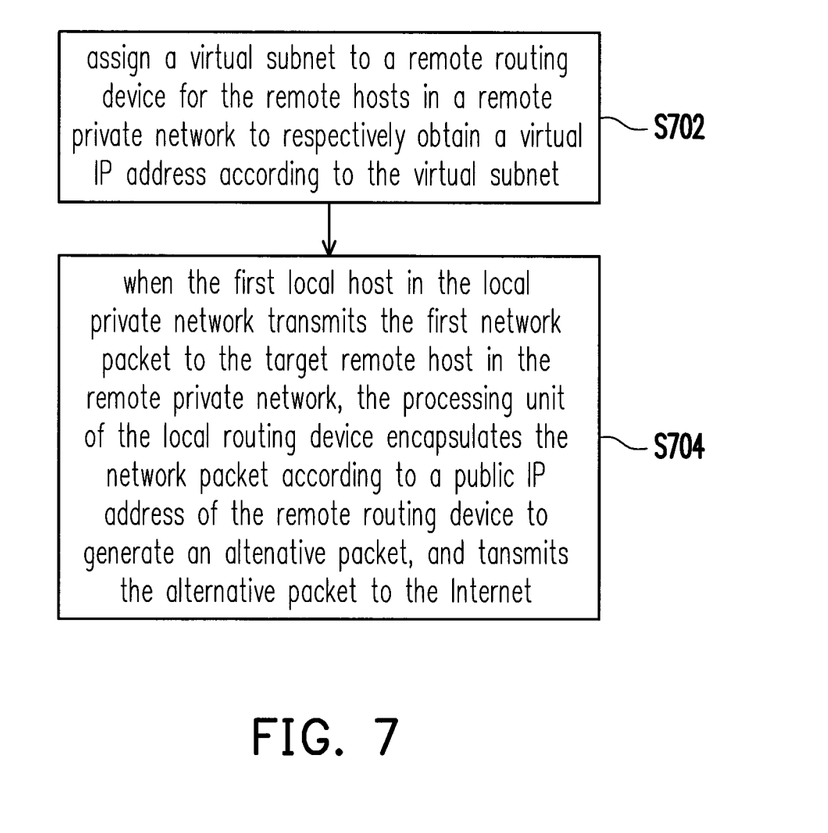
FIG. 7 is a flowchart illustrating a virtual private network communication method according to an embodiment of the invention.

FIG. 7 is a flowchart illustrating the virtual private network communication method according to an embodiment of the invention.

Referring to FIG. 7, in step S702, the processing unit of the local routing device assigns the virtual subnet to the remote routing device for the remote hosts in the remote private network to respectively obtain the virtual IP address according to the virtual subnet. It should be note that in the present embodiment, the virtual IP address of each host may be individually assigned by one routing device, or obtained by each host according to the virtual subnet being assigned (e.g., assigning with the virtual subnet and the original private IP address), the invention is not limited thereto.

In step S704, when the local host in the local private network transmits a network packet to the target remote host in the remote private network, the processing unit of the local routing device encapsulates the network packet according to the public IP address and the public port number of the remote routing device to generate the alternative packet, and delivers the alternative packet to the Internet. The alternative packet includes the network packet being encapsulated, and the destination IP address of the network packet being encapsulated is the virtual IP address obtained by the target remote host.

Figure 8:
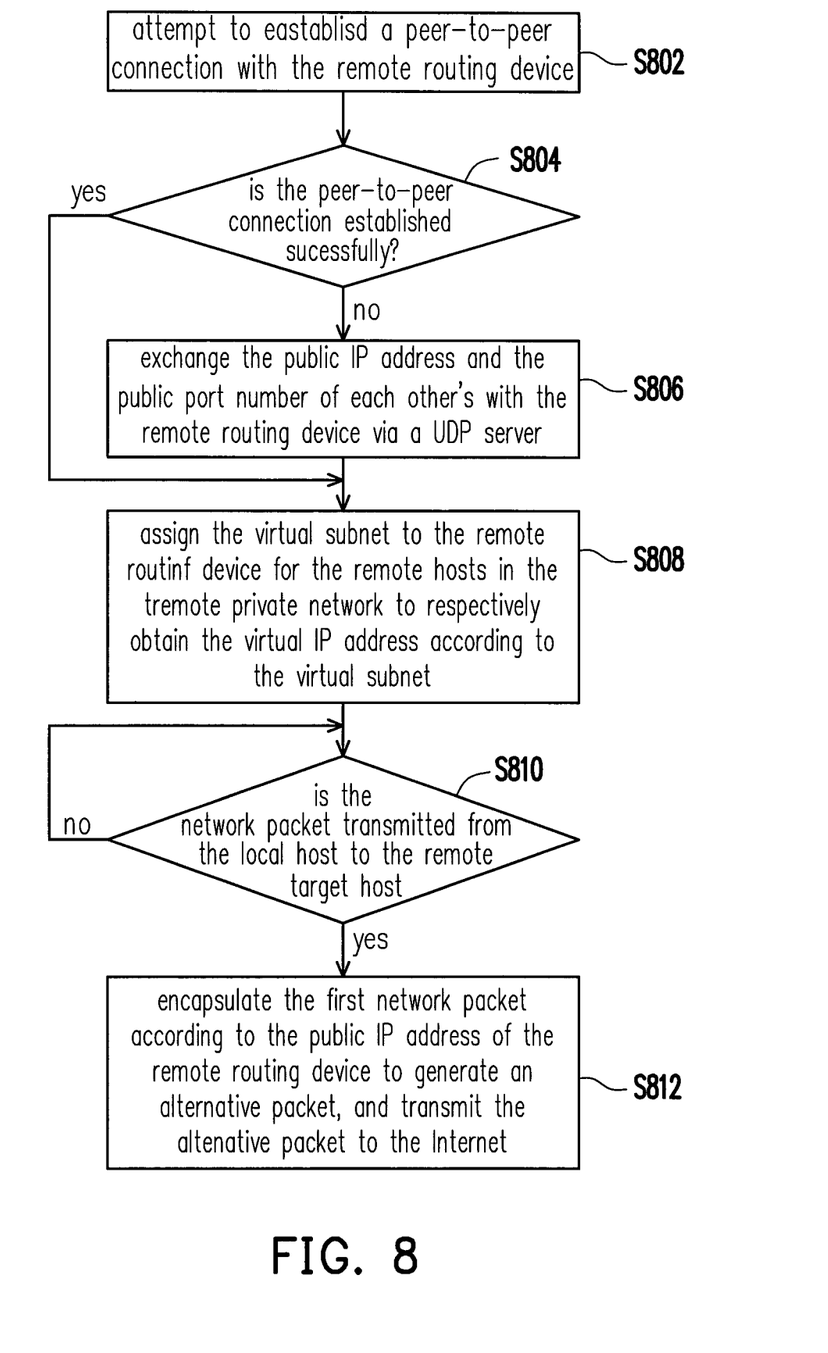
FIG. 8 is a flowchart illustrating the virtual private network communication method according to another embodiment of the invention.

FIG. 8 is a flowchart illustrating the virtual private network communication method according to another embodiment of the invention. Referring to FIG. 8, in the present embodiment, in the case when the packets may not be transmitted successfully or the connection may not be established between the local routing device and the remote routing device due to blocking of the firewall or other packet filtering mechanism, the local routing device and the remote routing device may respectively obtain the public IP address and the public port number of each other's via a UDP server.

In step S802, the processing unit of the local routing device attempts to establish a peer-to-peer connection with the remote routing device through the second network interface unit. Next, proceeding to step S804 after step S802 is completed. In step S804, the processing unit of the local routing device determines whether the peer-to-peer connection is successfully established with the remote routing device. If the peer-to-peer connection is successfully established with the remote routing device by the processing unit of the local routing device in step S804, proceeding to step S808 after step S804 is completed. If the peer-to-peer connection is not successfully established with the remote routing device by the processing unit of the local routing device in step S804, proceeding to step S806 after step S804 is completed.

In step S806, the processing unit of the local routing device delivers the public IP address and the public port number of the local routing device to the remote routing device via a UDP server, so as to obtain the public IP address and the public port number of the remote routing device. Next, proceeding to step S808 after step S806 is completed. If the peer-to-peer connection is successfully established with the remote routing device by the local routing device in step S804, proceeding to step S808 after step S804 is completed. In step S808, the processing unit of the local routing device assigns the virtual subnet to the remote routing device for the remote hosts in the remote private network to respectively obtain the virtual IP address according to the virtual subnet. Next, proceeding to step S810 after step S808 is completed.

In step S810, the processing unit of the local routing device determines whether a network packet is transmitted from the local host in the local private network to the target remote host in the remote private network. If the processing unit of the local routing device determines that no any network packet is transmitted from the local host in the local private network to the target remote host in the remote private network in step S810, the processing unit of the local routing device continued in monitoring whether a network packet is transmitted from the local host in the local private network to the target remote host in the remote private network after step S810 is completed. If the processing unit of the local routing device determines that a network packet is transmitted from the local host in the local private network to the target remote host in the remote private network in step S810, proceeding to step S812 after step S810 is completed In step S812, the processing unit of the local routing device encapsulates the network packet according to the public IP address and the public port number of the local routing device as well as the public IP address and the public port number of the remote routing device to generate an alternative packet, and the processing unit of the local routing device delivers the alternative packet to the Internet through the second network interface unit.

Figure 9:
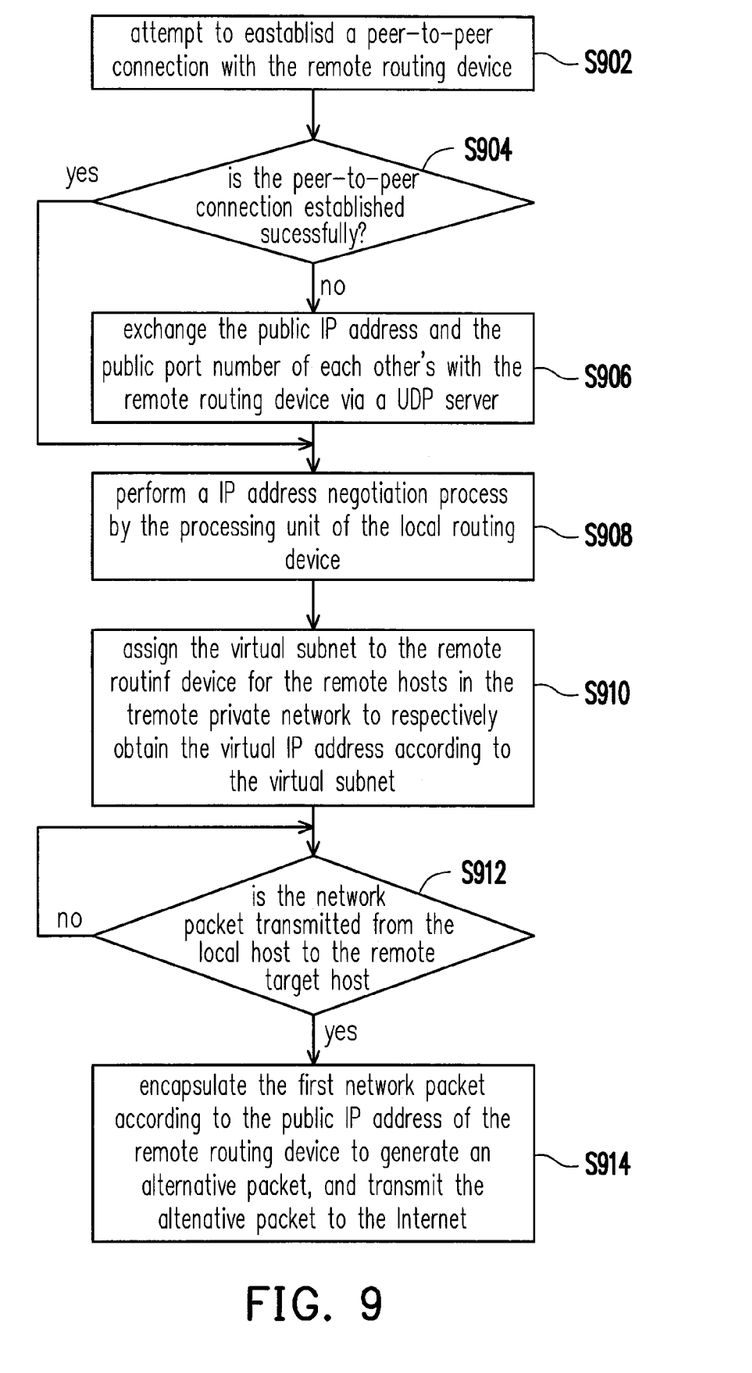
FIG. 9 is a flowchart illustrating the virtual private network communication method according to yet another embodiment of the invention.

FIG. 9 is a flowchart illustrating the virtual private network communication method according to yet another embodiment of the invention. Referring to FIG. 9, in the present embodiment, the local routing device performs an IP address negotiation process, so as to avoid the same virtual subnet from being used in the private networks.

In step S902, the processing unit of the local routing device attempts to establish a peer-to-peer connection with the remote routing device through the second network interface unit. Next, proceeding to step S904 after step S902 is completed. In step S904, the processing unit of the local routing device determines whether the peer-to-peer connection is successfully established with the remote routing device. If the peer-to-peer connection is successfully established with the remote routing device by the processing unit of the local routing device in step S904, proceeding to step S908 after step S904 is completed. If the peer-to-peer connection is not successfully established with the remote routing device by the processing unit of the local routing device in step S904, proceeding to step S906 after step S904 is completed.

In step S906, the processing unit of the local routing device delivers the public IP address and the public port number of the local routing device to the remote routing device via a UDP server, so as to obtain the public IP address and the public port number of the remote routing device. Next, proceeding to step S908 after step S906 is completed. If the peer-to-peer connection is successfully established with the remote routing device by the processing unit of the local routing device in step S904, proceeding to step S908 after step S904 is completed.

In step S908, the processing unit of the local routing device performs an IP negotiation process. For instance, the processing unit of the local routing device may check, record and assign the virtual subnet unassigned to the remote routing device. Next, proceeding to step S910 after step S908 is completed. In step S910, the processing unit of the local routing device assigns the virtual subnet to the remote routing device for the remote hosts in the remote private network to respectively obtain the virtual IP address according to the virtual subnet. Next, proceeding to step S912 after step S910 is completed.

In step S912, the processing unit of the local routing device determines whether a network packet is transmitted from the local host in the local private network to the target remote host in the remote private network. If the processing unit of the local routing device determines that no any network packet is transmitted from the local host in the local private network to the target remote host in the remote private network in step S912, the processing unit of the local routing device continued in monitoring whether a network packet is transmitted from the local host in the local private network to the target remote host in the remote private network after step S912 is completed. If the processing unit of the local routing device determines that a network packet is transmitted from the local host in the local private network to the target remote host in the remote private network in step S912, proceeding to step S914 after step S912 is completed In step S914, the processing unit of the local routing device encapsulates the network packet according to the public IP address and the public port number of the local routing device as well as the public IP address and the public port number of the remote routing device to generate the alternative packet, and the processing unit of the local routing device delivers the alternative packet to the Internet through the second network interface unit.

Figure 10:
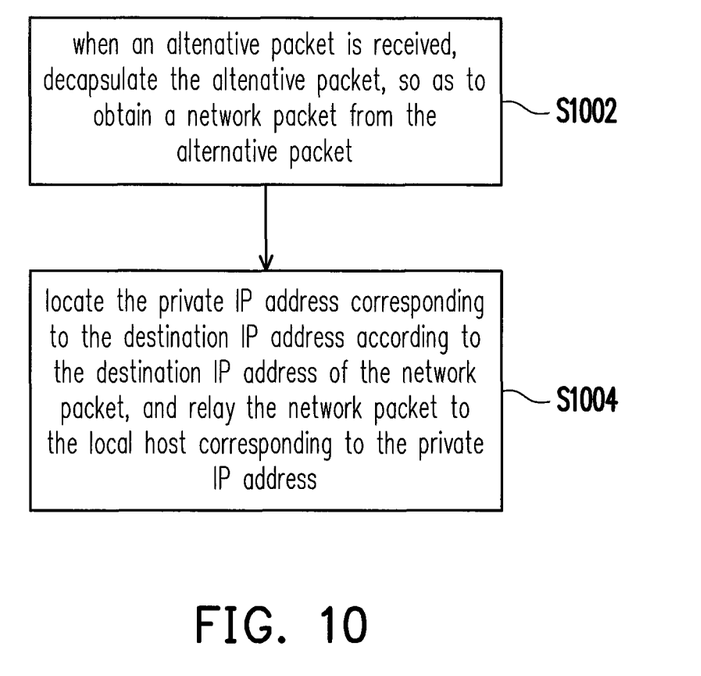
FIG. 10 is a flowchart illustrating a virtual private network communication method according to an embodiment of the invention.

FIG. 10 is a flowchart illustrating a virtual private network communication method according to an embodiment of the invention. Referring to FIG. 10. More specifically, the present embodiment is used to describe operations of the local routing device or the remote routing device after the alternative packet is received.

In step S1002, when the second network interface unit of the local routing device receives an alternative packet, the processing unit of the local routing device decapsulates the alternative packet and obtain a network packet from the alternative packet. Next, proceeding to step S1004 after step S1002 is completed. In step S1004, the first network interface unit of the local routing device locates the private IP address corresponding to the destination IP address in the IP header of the network packet by checking the IP address mapping table according to the destination IP address in the IP header of the network packet, and relays the network packet to the local host corresponding to the private IP address.

It should be noted that, with respect to the above methods, which may refer to teachings, suggestions and descriptions disclosed in the forgoing embodiments, thus detailed description is omitted hereinafter.

In view of above, the virtual private network communication method and the routing device using the same as disclosed in the embodiments of the invention may be used to assign the virtual subnet to the remote routing device by using an IP address negotiation process for at least one remote host in the remote private network to respectively obtain at least one virtual IP address according to the virtual subnet. When the local host in the local private network transmits the network packet to the target remote host in the remote private network, the network packet may be encapsulated according to the virtual IP address obtained by the target remote host to generate the alternative packet. Furthermore, when an alternative packet is received, the alternative packet is decapsulated, so as to obtain the network packet from the alternative packet. Next, the destination IP address of the network packet may be used to locate the private IP address corresponding to the destination IP address, and the network packet is then relaid to the local host corresponding to the private IP address. Accordingly, a plurality of hosts in different private networks may respectively perform the network communication by using the virtual IP address being assigned.

It will be apparent to those skilled in the art that various modifications and variations can be made to the structure of the disclosed embodiments without departing from the scope or spirit of the disclosure. In view of the foregoing, it is intended that the disclosure cover modifications and variations of this specification provided they fall within the scope of the following claims and their equivalents.

What is claimed is:

1. A routing device, comprising:
a first network interface unit, configured to connect the routing device to a local private network;
a second network interface unit, configured to connect the routing device to the Internet; and
a processing unit, coupled to the first network interface unit and the second network interface unit, and configured to assign a virtual subnet to a remote routing device for at least one remote host in a remote private network to obtain at least one virtual Internet protocol (IP) address according to the virtual subnet,
wherein when a first local host in the local private network transmits a first network packet to a target remote host in the remote private network, the processing unit receives the first network packet through the first network interface unit; encapsulates the first network packet according to a public IP address of the remote routing device to generate a first alternative packet; and delivers the first alternative packet to the Internet through the second network interface unit,
wherein the first alternative packet comprises the first network packet, and a destination IP address of the first network packet is the virtual IP address of the target remote host,
wherein the processing unit attempts to establish a peer-to-peer connection to the remote routing device through the second network interface unit; determines whether the peer-to-peer connection is successfully established; and delivers a first public IP address and a first public port number of the routing device to the remote routing device through the second network interface unit via a user datagram protocol (UDP) server when the peer-to-peer connection is not successfully established, so as to obtain a second public IP address and a second public port number of the remote routing device,
wherein the processing unit locates the second public IP address and the second public port number of the remote routing device corresponding to the virtual IP address according to the virtual IP address obtained by the target remote host in an IP header of the first network packet; encapsulates the first public IP address and the second public address into an IP header of the first alternative packet, and encapsulates the first public port and the second public port into a UDP header of the first alternative packet.

2. The routing device of claim 1, wherein the processing unit further assigns at least one virtual subnet to at least one remote routing device, wherein the at least one virtual subnet assigned to the at least one remote routing device is different from each other.

3. The routing device of claim 1, further comprising:
a storage unit, configured to store a bitmap table,
wherein the processing unit is configured to perform an IP address negotiation process, during the IP address negotiation process, the processing unit obtains at least one candidate virtual subnet not being assigned from the bitmap table; selects the virtual subnet from the at least one candidate virtual subnet; assigns the virtual subnet to the remote routing device; records the virtual subnet into the bitmap table; and marks the virtual subnet as being assigned to the remote routing device.

4. The routing device of claim 3, wherein the bitmap table is composed by a two-dimensional array with at least one row and at least one column, the at least one row and the at least one column are corresponded to two digits of a virtual subnet, and a usage status of the virtual subnet is marked on at least one intersection corresponding to the two digits in the two-dimensional array.

5. The routing device of claim 4, wherein the processing unit marks the virtual subnet not being assigned onto the bitmap table by utilizing a first identification code; marks a virtual subnet owned by the routing device onto the bitmap table by utilizing a second identification code; and marks the candidate virtual subnet being assigned onto the bitmap table by utilizing a third identification code.

6. The routing device of claim 4, wherein the bitmap table comprises 255 rows and 255 columns.

7. The routing device of claim 1, wherein the processing unit assigns a local virtual IP address to the first local host in the local private network; sets the local virtual IP address as a source IP address of the first network packet; and transmits the first alternative packet to the remote routing device through the second network interface unit after the first alternative packet is generated, so as to relay the first alternative packet to the target remote host.

8. The routing device of claim 7, wherein when the second network interface unit receives a second alternative packet, the processing unit decapsulates the second alternative packet to obtain a second network packet from the second alternative packet; locates a private IP address corresponding to a destination IP address of the second network packet according to the destination IP address of the second network packet; and relays the second network packet to a second local host corresponding to the private IP address through the first network interface unit.

9. The routing device of claim 1, wherein the processing unit utilizes the first network packet as a UDP payload of the first alternative packet.

* * * * *